April 8, 1930.  H. E. BRETT  1,753,818
VALVE
Filed March 6, 1926   3 Sheets-Sheet 1
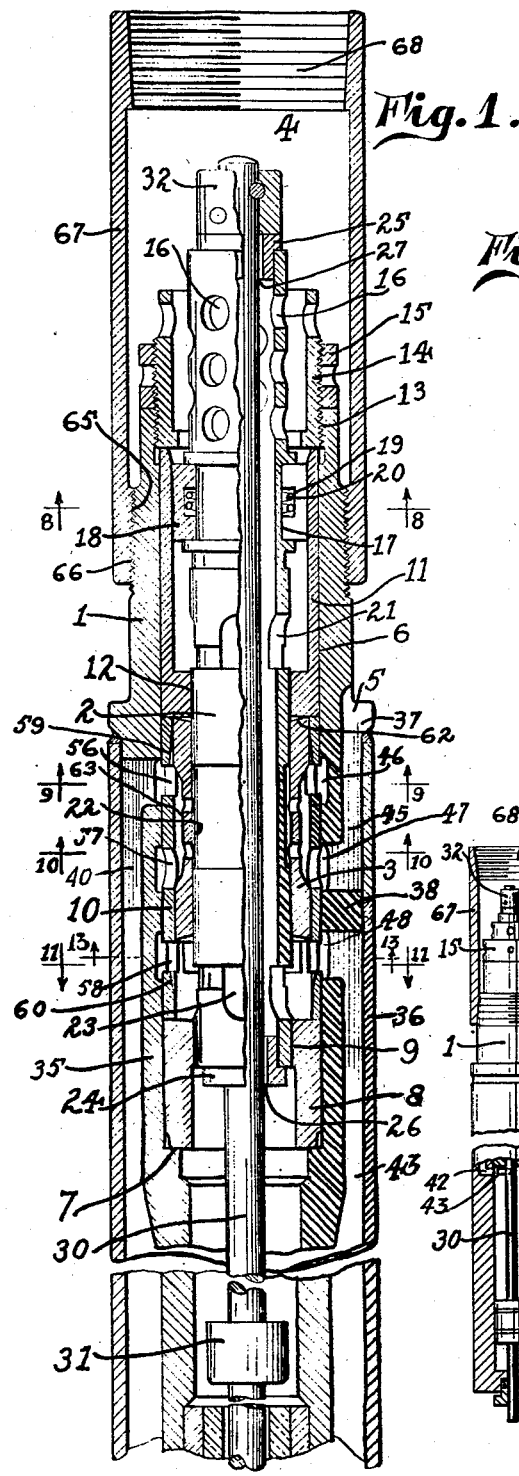
Fig.1.
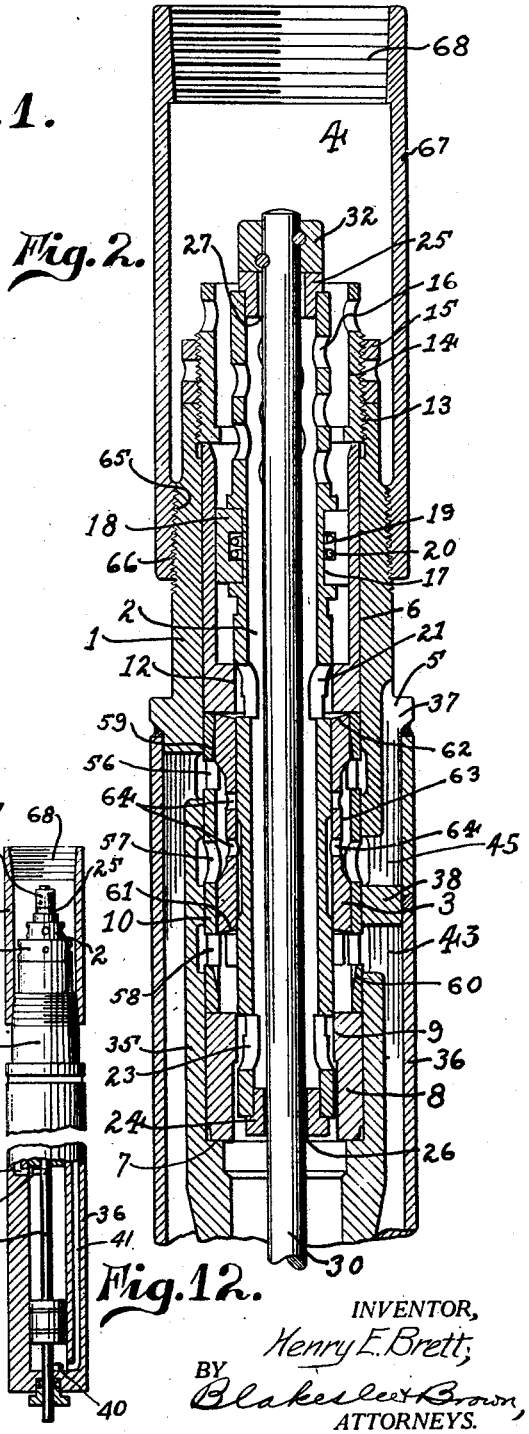
Fig.2.
Fig.12.
INVENTOR,
Henry E. Brett,
BY Blakeslee+Brown
ATTORNEYS.

April 8, 1930.　　　　　H. E. BRETT　　　　　1,753,818
VALVE
Filed March 6, 1926　　　3 Sheets-Sheet 2

INVENTOR,
Henry E. Brett;
BY Blakeslee Brown
ATTORNEYS.

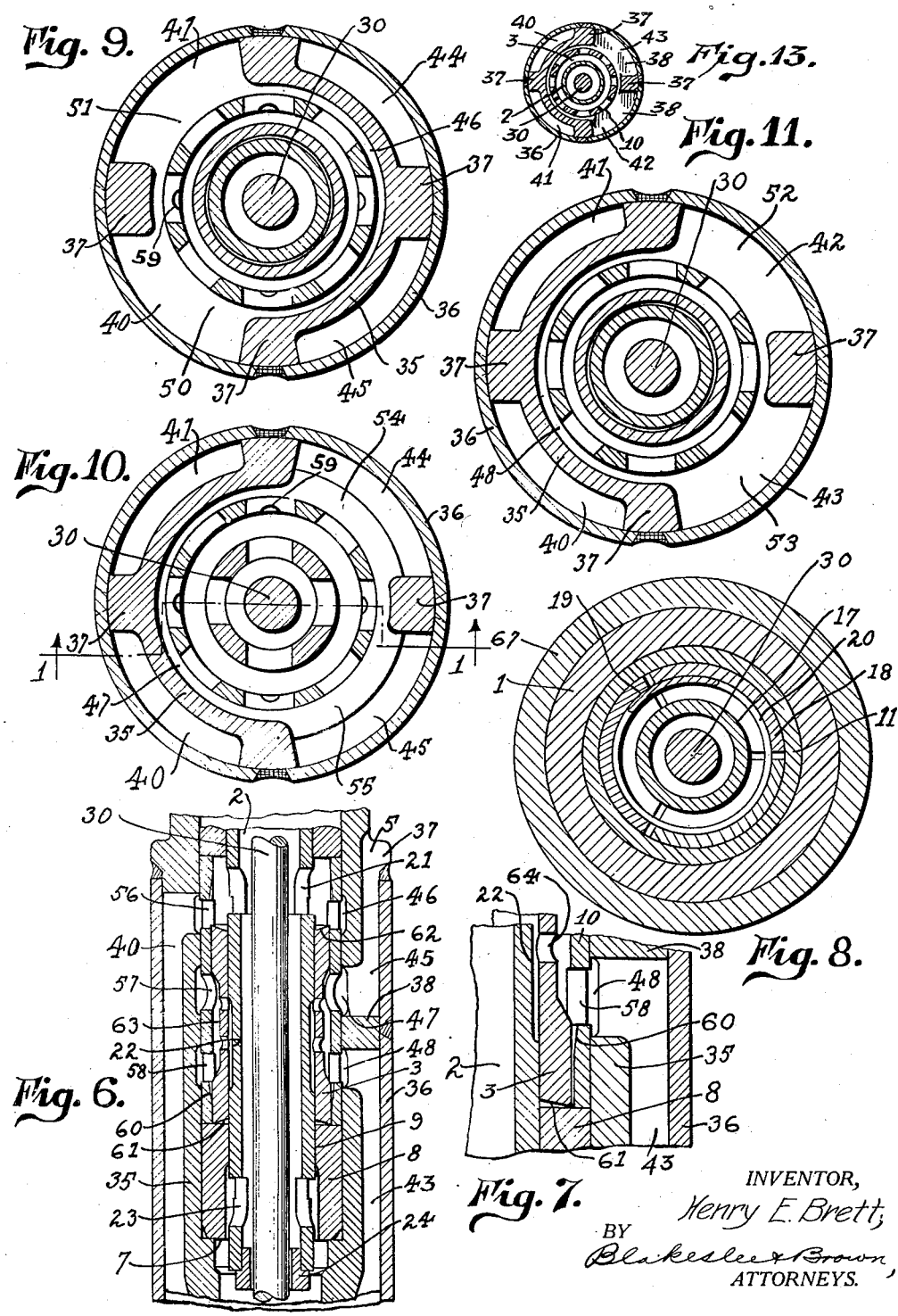

Patented Apr. 8, 1930

1,753,818

UNITED STATES PATENT OFFICE

HENRY E. BRETT, OF LOS ANGELES, CALIFORNIA, ASSIGNOR TO JOHN A. YERKES, OF LONG BEACH, CALIFORNIA

VALVE

Application filed March 6, 1926. Serial No. 92,805.

This invention relates to valves, and particularly to valves for engines designed for use where space is limited, such as in the bottom of an oil well for operating the oil pump to pump the oil out of the well. More specifically the valve is adapted for use in single cylinder engines without fly-wheels and where the valve is in axial alignment with the engine piston and must be operated directly and entirely by the piston.

The general object of the invention is to provide a practical valve of the character stated which will be highly efficient in operation, and which may be conveniently embodied and operated in a limited space such as in a pump engine in the bottom of an oil well.

With the above and other objects in view, the invention consists in the novel and useful provision, formation, construction and inter-relation of parts, members and features, all as shown in the drawing, hereinafter described, and finally pointed out in claims.

In the drawings:

Figure 1 is a vertical longitudinal section taken on line 1—1 of Fig. 10 of the valve shown moved to the upper end of its stroke, with the engine piston shown on its downward stroke and in engagement with the valve for moving the valve downward to reverse the stroke of the piston;

Figs. 2, 3, 4, 5 and 6 are also vertical longitudinal sectional views of the valve, showing progressively the different positions of the valve on its downward stroke to its lowermost position;

Fig. 7 is an enlgared fragmentary longitudinal sectional view of the valve shown in its lowermost position as in Fig. 6;

Figure 3:
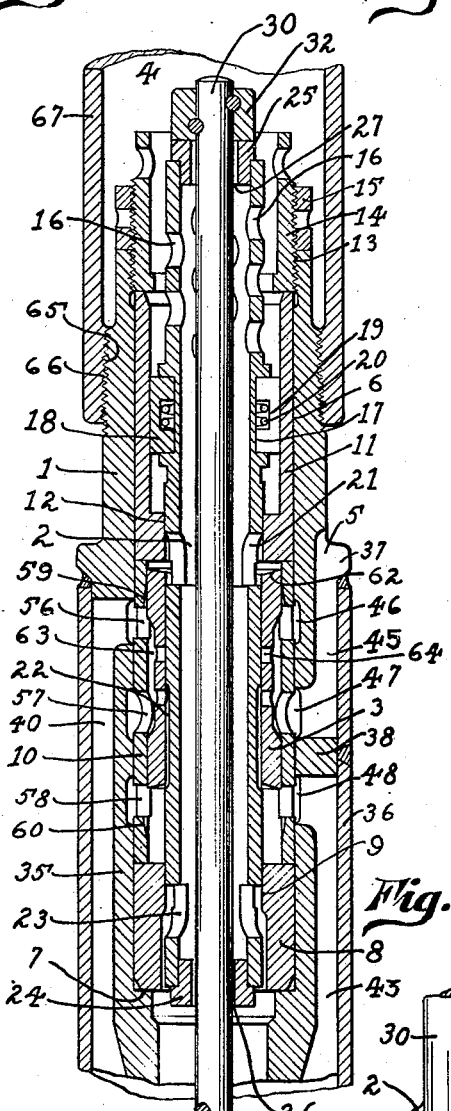

Figures 8, 9, 11 and 10 are horizontal sections taken respectively on lines 8—8, 9—9, 10—10, and 11—11 respectively of Fig. 1;

Figure 12 is a diagrammatic view showing the valve and the engine which the valve controls, looking in the opposite direction from the viewpoint of Fig. 1; and Fig. 13 is a section on line 13—13 of Fig. 1.

Corresponding parts in all the figures are designated by the same reference characters.

Referring with particularity to the drawing, 1 indicates a valve cylinder, 2 a hollow valve plunger reciprocatively mounted in said cylinder, 3 a hollow auxiliary valve plunger, 4 a valve inlet and 5 a valve outlet.

The cylinder 1 is provided with a bore 6 extending downwardly therein, a uniform diameter, from its upper end to a shoulder 7 in the lower portion thereof, from which shoulder downwardly the bore is reduced slightly in diameter. In the lower end of the cylinder bore 6 is fitted a bushing 8 which rests at its lower end upon the shoulder 7 and is formed in its upper end with a bearing 9 in which the lower end of the plunger 2 is slidably mounted. In the bore 6 above the bushing 8 is fitted a bushing 10, of larger internal diameter than the bushing 8, the bushing 10 resting at its lower end upon the upper end of the bushing 8 and surrounding the auxiliary plunger 3 which is slidably mounted between the bushing 10 and the plunger 2. In the bore 6 above the bushing 10 is fitted a bushing 11 which rests at its lower end upon the upper end of the bushing 10. The bushing 11 has an internal diameter somewhat larger than the external diameter of the plunger 2, but said bushing is formed with a bearing 12 in its lower end in which the plunger 2 is slidably mounted. The cylinder 1 is provided with an internal thread 13 in the upper end of its bore 6, in which thread is seated an externally threaded locking sleeve 14, the lower end of which sleeve engages the upper end of the bushing 11 and locks said bushing together with the bushings 10 and 9 in the bore 6. A lock nut 15 screws on the external thread of the locking sleeve 14 against the upper end of the valve cylinder 1 for locking the sleeve in locking position against turning. The upper end portion of the plunger 2 is provided with a plurality of inlets 16. Below the inlets 16 the plunger 2 is formed with an annular groove 17 in which is fitted a split friction ring 18 formed with an internal annular groove 19 in which is fitted a coil spring 20 which urges the sections of the ring outwardly into frictional contact with the inner surface of the bushing 11 for holding the plunger in any position into which it is moved. The plunger 2 is provided with outlets 21 below the groove 17, which outlets rest within the lower part of bushing 11 immediately above the bushing bearing 12 when the plunger is in its uppermost position (see Fig. 1). The plunger 2 is provided with a wide shallow annular external groove 22 below the outlets 21 which groove rests adjacent the inner surface of the auxiliary plunger 3. In the lower end of the plunger 2 is provided a plurality of outlets 23 which rest in the lower end of the bushing 10 immediately above the bearing 9 when the plunger is raised to its uppermost position (see Fig. 1). Heads 24 and 25 are fitted in the lower and upper ends of the plunger 2 respectively, which heads have central bores 26 and 27 through which and the plunger extends the valve rod 30 of the engine controlled by the valve. A collar 31 is secured on the lower portion of the valve rod 30 for engaging the lower head 24 for effecting the upward stroke of the plunger, and a collar 32 is secured on the upper end of the valve rod 30 for engaging the upper head 26 for effecting the downward stroke of the plunger.

The lower portion of the cylinder 1 includes an inner cylindrical wall 35 and an outer cylindrical wall 36 spaced from the inner wall a short distance by outstanding longitudinal ribs 37 and two segmental ribs 38 on the inner wall, there being preferably four of the ribs 37 spaced equi-distantly apart and the ribs 38 being located near the upper end of the outer wall 36 and extending from a common longitudinal rib 37 respectively in opposite directions to the next ribs 37. Passages 40 and 41 are formed between certain of the ribs 37 and between the inner cylinder wall 35 and outer cylinder wall 36, while passages 42 and 43 are formed between the other ribs 37 and between the cylinder walls below the rib 38, and passages 44 and 45 are formed between the ribs 37 and between the cylinder walls above the rib 38. The inner cylinder wall 35 is formed in the upper portion thereof with three internal annular grooves 46, 47, 48, spaced a short distance apart one below the other. The inner cylinder wall 35 is also formed with ports 50, 51, 52, 53, 54 and 55, which establish communication between the interior of said cylinder wall and the passages 40, 41, 42, 43, 44 and 45 respectively. The passages 44 and 45 lead upwardly into the outlet 5.

In the form of the invention illustrated the valve cylinder is formed in an extension of the engine cylinder and the passages 42 and 43 open into the upper part of the engine cylinder and ports 40 and 41 into the lower part (see Fig. 12).

The bushing 10 is provided with a plurality of ports 56, 57 and 58 which register with the annular internal grooves 46, 47 and 48 respectively in the inner wall 35 of the cylinder. The inner surface of the bushing 10 is provided with grooves 59 inclined outwardly in a downward direction to the ports 56, and with grooves 60 inclined outwardly in an upward direction to ports 58, for the purpose hereinafter described.

The lower end of the auxiliary plunger 3 is beveled upwardly in an inward direction as at 61 and the upper end of said plunger is beveled downwardly in an inward direction as indicated at 62 for the purpose hereinafter described. The plunger 3 is formed with a wide annular groove 63 in its outer surface, the lower and upper edges of which groove are beveled. The plunger 3 is provided with ports 64 extending from the bore of the plunger into the groove 63.

On the upper part of the cylinder 1 is provided an external thread 65 which is engaged by a thread 66 in the lower end of a tube 67 which forms the inlet 4, the upper end of which tube is provided with an internal thread 68 for connecting the tube to a source of fluid supply under pressure.

Figure 4:
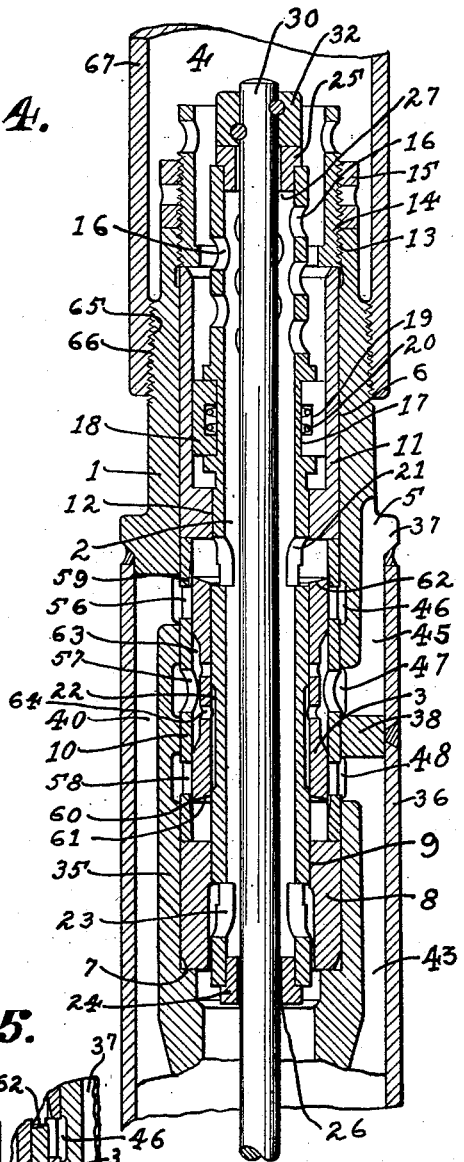
Figure 5:
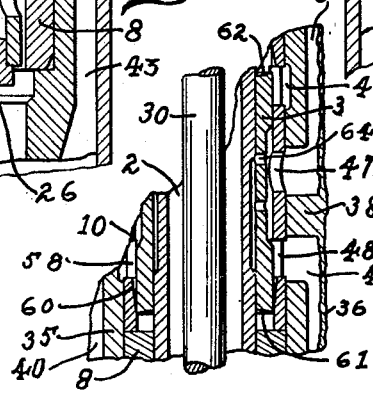

The operation of the valve is as follows: Assuming the valve plunger 2 to be at the upper end of its stroke, as in Fig. 1, fluid, such as oil, under pressure is introduced through inlet 4, sleeve 14 and ports 16 into the plunger 2, from which the fluid passes through the ports 21 into the cylinder 1 within the bushing 11 below the ring 18, and through the ports 23 and 58 and the groove 48 through ports 52 and 53 and the passages 42 and 43 into the upper end of the engine cylinder where the fluid effects the downward stroke of the engine piston and valve rod 30, the upper position of the auxiliary plunger 3 preventing the escape of any fluid from the passages 42 and 43 through ports 57, passages 44 and 45 and outlet 5, but allowing fluid to escape from the lower end of the cylinder through passages 40 and 41, openings 50 and 51, groove 46, ports 56, groove 63, ports 57, groove 47, openings 54 and 55, passages 44 and 45 and outlet 5. As the piston rod approaches the end of its downward stroke the collar 32 engages the upper plunger head 25 and forces the plunger 2 downward. On the downward stroke of the plunger the ports 23 pass into the bearing 9 and are closed, which shuts off the fluid to the passages 42 and 43, while the ports 21 pass through the bearing 12 and admit fluid under pressure between the lower end of the bearing and the beveled upper end 62 of the auxiliary plunger 3, whereupon said plunger is forced down (see Figs. 2 and 3). As the plungers 2 and 3 continue their downward movement, the plunger 2 moving slightly faster than the plunger 3, the lower edge of the annular groove 22 passes below the lower end of the auxiliary plunger 3 and allows a sufficient amount of fluid in the space about the lower end of the auxiliary plunger to be displaced through said groove 22, ports 64 and 57, groove 48, openings 54 and 55, passages 44 and 45 and outlet 5, by the downward movement of the auxiliary plunger (see Figs. 3 and 4) until the lower end of said plunger passes below the ports 58 in the bushing 10, whereupon the remaining oil below the auxiliary plunger within the bushing 10, is forced upwardly by said plunger during the remainder of its downward stroke, through the grooves 60 of the bushing 10 and out through the groove 63, ports 57, passages 44 and 45 and outlet 5 (see Fig. 6). During the extreme latter part of the stroke the end of the grooves 60 having been reached the fluid beneath the auxiliary plunger 3, gradually seeps out through the normal operating clearance between it and the bushing 10, as shown exaggerated in Fig. 7. With the engine piston and rod 30 and the plunger 2 and auxiliary plunger 3 at the end of their downward stroke fluid under pressure passes from the plunger 2 through ports 21, upper end of bushing 10, ports 56, groove 46, ports 50 and 51 and passages 40 and 41 into the lower end of the engine cylinder, whereupon the upward stroke of the engine piston is effected (see Fig. 6). As the engine piston moves upward oil is forced out of the engine cylinder through passages 42 and 43, ports 52 and 53, ports 58, groove 63 in the auxiliary plunger, ports 57, groove 47, openings 54 and 55, passages 44 and 45 and outlet 5.

As the engine piston and valve rod 30 approach the end of their upward stroke the collar 31 engages the lower plunger head 24 and effects the upward movement of the plunger 2. During the upward movement of said plunger the ports 21 pass through the bearing 12 and shut off the fluids from the plunger through bushing 10, ports 56, grooves 46, openings 50 and 51 and passages 40 and 41 to the engine cylinder, while the ports 23 pass above the bearing 9, whereupon fluid under pressure passes from the plunger through said ports between the bearing and the lower beveled end 61 of the auxiliary plunger 3 and effects the upward stroke of the auxiliary plunger, during the end of which stroke the oil in the upper end of the bushing 10 is forced by the upper end of the auxiliary plunger through grooves 59 in the upper end of said bushing, out through ports 56, groove 46 and openings 50 and 51 into the passages 40 and 41, thus permitting the auxiliary plunger to reach the upper end of its stroke.

It is obvious that various modifications, changes, and variations may be made in practicing the invention, in departure from the specific features so disclosed, without departing from the true spirit of the invention.

Having thus disclosed my invention, I claim and desire to secure by Letters Patent:

1. A valve for engines, comprising a cylinder provided with fluid passages for communication with the ends respectively of the engine cylinder and provided with an inlet and an outlet, a valve rod, a plunger mounted to reciprocate in said cylinder and through which plunger the engine valve rod extends, means on the valve rod for reciprocating said plunger, said plunger including means for controlling said passages when reciprocated to reciprocate the engine piston, an auxiliary plunger surrounding said plunger, whereby initial reciprocation of the plunger will cause the operating fluid to effect movement of the auxiliary plunger to establish communication between said passages respectively and said inlet and outlet to permit fluid to enter and exhaust from the engine cylinder.

2. A valve for engines, comprising a cylinder provided with fluid passages for communication with the ends respectively of the engine cylinder and provided with an inlet and an outlet, a valve rod, a plunger mounted to reciprocate in said cylinder and through which plunger the engine valve rod extends, means on the valve rod for reciprocating said plunger, said plunger including means for controlling said passages when reciprocated to reciprocate the engine piston, an auxiliary plunger within said cylinder and surrounding said plunger, whereby initial reciprocation of the plunger will cause the operating fluid to effect movement of the auxiliary plunger to establish communication between said passages respectively and said inlet and outlet to permit fluid to enter and exhaust from the engine cylinder, and means for holding said plunger in any position to which it may be moved by said means on the valve rod.

3. A valve for controlling the passage of fluid from a source of fluid suply to an engine cylinder, comprising a valve cylinder having passages in the wall thereof communicating with the engine cylinder and with an inlet and outlet for motive fluid, a hollow plunger operable within the valve cylinder and provided with sets of ports in the wall thereof, the bore of such first named plunger being at all times in communication with said inlet, an auxiliary plunger also operable within such cylinder and outside of the first plunger and having passages to establish communication alternately of one of said sets of ports with a valve cylinder passage and to place the other valve cylinder passage in communication with said outlet, and means operable by the engine for operating the first named plunger to cause fluid to be directed from the bore of such plunger through the ports therein to operate the auxiliary plunger.

4. A valve adapted to be interposed between a source of fluid supply and an engine cylinder including a valve cylinder formed with two passages communicating with the engine cylinder and formed with an outlet passage, a plunger operable in the valve cylinder and provided with an internal passage open to the source of fluid supply, an auxiliary plunger within such cylinder surrounding the first plunger, said first plunger being formed with sets of ports in the wall thereof adapted to be placed alternately in communication with a valve cylinder passage, said auxiliary plunger having passages to establish communication alternately of one of said sets of ports with a valve cylinder passage and to place the other valve cylinder passage in communication with said outlet passages, and means operable by the engine for reciprocating such first plunger.

5. A valve adapted to be interposed between a source of fluid supply and an engine cylinder comprising a valve cylinder formed with two passages and formed with an outlet passage, a plunger operable in the valve cylinder and provided with an internal passage open to the source of fluid supply, an auxiliary plunger operable within said cylinder surrounding the first plunger, said first plunger being formed with sets of ports in the wall thereof adapted to be placed in communication alternately with one of the valve cylinder passages communicating with the engine cylinder said plunger having a recess in the external wall thereof adapted to provide a passage between the other valve cylinder passage communicating with the engine cylinder and the outlet passage, said auxiliary plunger having passages to establish communication alternately of one of said sets of ports with a valve cylinder passage and the other cylinder passage with said outlet and means operable by the engine for reciprocating the first plunger.

6. A valve adapted to be interposed between a source of fluid supply and an engine cylinder comprising a valve cylinder formed with two passages communicating with the engine cylinder and with an inlet and outlet for motive fluid, a plunger operable in the valve cylinder and provided with an internal passage open to said inlet, an auxiliary plunger within said cylinder surrounding the first plunger, said first plunger being formed with sets of ports in the wall thereof adapted to be placed alternately in communication with one of said cylinder passages, said auxiliary plunger having passages to establish communication alternately of one set of said ports with a valve cylinder passage and to place the other valve cylinder passage in communication with said outlet, a valve rod operable by the engine and extending through the first plunger, and collars on such rod above and below such plunger for effecting reciprocation of the same.

7. A valve adapted to be interposed between a source of fluid supply and an engine cylinder, comprising a valve cylinder formed with two passages in the wall thereof for communication with the engine cylinder and formed with an outlet passage, a plunger operable in the valve cylinder and provided with an internal passage open to the source of fluid supply, said plunger being formed with ports in the wall thereof, an auxiliary plunger operable between the first plunger and the valve cylinder also having ports through the wall thereof and having a recess in the external surface embracing the port openings, whereby movement of the first plunger controls the passage of fluid from the source of fluid supply through the valve to the engine through one of said valve cylinder passages and from the engine to the outlet through the other of said valve cylinder passages, and means operable by the engine for operating the first plunger.

8. A valve adapted to be interposed between a source of fluid supply and an engine cylinder comprising a valve cylinder formed with two passages in the wall thereof communicating with the engine cylinder and provided with an outlet passage, a plunger operable in the valve cylinder and provided with an internal passage open to the source of fluid supply, said plunger being formed with two ports spaced longitudinally in the wall thereof, an auxiliary plunger operable between the first named plunger and the valve cylinder having terminal portions adapted to overlie one of the ports in the first plunger to prevent passage of fluid from the source of fluid supply through one of said cylinder passages while permitting passage through the other cylinder passage, said auxiliary plunger having passage to place the first named cylinder passage in communication with said outlet passage, and means operable by the engine for reciprocating the first plunger.

9. A valve adapted to be interposed between a source of fluid supply and an engine cylinder comprising a valve cylinder formed with two passages in the wall thereof communicating with the engine cylinder and provided with an outlet passage, a plunger operable in the valve cylinder and provided with an internal passage open to the source of fluid supply, said plunger being formed with two ports spaced longitudinally in the wall thereof, spaced plunger bearings in the cylinder wall adapted to close the plunger ports, an auxiliary plunger operable in the cylinder surrounding the first plunger, and having passages to control said ports and alternately connect one engine cylinder passage with the source of fluid supply and the other with said outlet passage, movement of the first plunger supplying fluid through one of such ports to operate the auxiliary plunger, and means for retarding the motion of the auxiliary plunger near the ends of its stroke.

10. An engine valve including a valve cylinder provided with passages for communication with the engine, and an inlet and an outlet for motive fluid, projecting spaced plunger bearings within such cylinder, a plunger operable within such cylinder and having spaced longitudinal ports adapted to be closed by such plunger bearings and having an internal passage open to said inlet, an auxiliary plunger operable within the cylinder and between the bearings, and having a passage to control said ports and to alternately connect one port with an engine passage and another engine passage with said outlet, whereby movement of the first plunger ports past the bearings enables passage of fluid through the plunger port to operate the auxiliary plunger.

In testimony whereof, I have signed my name to this specification.

HENRY E. BRETT.